US012043521B2

(12) United States Patent
Nagasawa

(10) Patent No.: US 12,043,521 B2
(45) Date of Patent: Jul. 23, 2024

(54) ELEVATOR SYSTEM

(71) Applicant: Shinsuke Nagasawa, Saitama (JP)

(72) Inventor: Shinsuke Nagasawa, Saitama (JP)

( * ) Notice: Subject to any disclaimer, the term of this patent is extended or adjusted under 35 U.S.C. 154(b) by 0 days.

(21) Appl. No.: 18/041,616

(22) PCT Filed: Aug. 11, 2021

(86) PCT No.: PCT/JP2021/029674

§ 371 (c)(1),
(2) Date: Feb. 14, 2023

(87) PCT Pub. No.: WO2022/039091

PCT Pub. Date: Feb. 24, 2022

(65) Prior Publication Data

US 2023/0322521 A1 Oct. 12, 2023

(51) Int. Cl.
*B66B 7/02* (2006.01)
*B66B 7/06* (2006.01)
*B66B 7/08* (2006.01)

(52) U.S. Cl.
CPC ................ *B66B 7/02* (2013.01); *B66B 7/068* (2013.01); *B66B 7/08* (2013.01)

(58) Field of Classification Search
CPC ..... B66B 11/022; B66B 11/0213; B66B 7/08; B66B 11/009; B66B 11/0095; B66B 2201/308; B66B 2201/307; B66B 2009/006; B66B 7/062; B66B 7/068
See application file for complete search history.

(56) References Cited

U.S. PATENT DOCUMENTS 1,911,834 A * 5/1933 David ................. B66B 11/0095 187/404
9,132,991 B2 * 9/2015 Husmann .............. B66B 11/022
2008/0149428 A1 * 6/2008 Kocher ..................... B66B 9/00 187/350
2011/0017551 A1 * 1/2011 Aulanko ................ B66B 11/08 187/249

FOREIGN PATENT DOCUMENTS

JP 2005187125 A 7/2005
JP 200636487 A 2/2006
(Continued)

OTHER PUBLICATIONS

Machine translation of JP 2006-036487.*
(Continued)

*Primary Examiner* — Diem M Tran
(74) *Attorney, Agent, or Firm* — Maier & Maier, PLLC

(57) ABSTRACT

An elevator system capable of reducing the overall installation area of elevators in a building while ensuring the number of passengers in the elevator. The elevator system arranges first and second elevator cars in a single elevator hoistway, having, at a lower portion of each of the first and second elevator cars, respectively, a pair of undercar pulleys are positioned to turn ropes vertically on the outer sides of the first and second elevator cars and horizontally at the bottom, where the arranging direction of the pair of the under-car pulleys of the first elevator car intersects with the arranging direction of the pair of under-car pulleys of the second elevator car when projected onto a horizontal plane.

5 Claims, 4 Drawing Sheets

(56) References Cited

FOREIGN PATENT DOCUMENTS

| | | | | |
|---|---|---|---|---|
| JP | 4311590 | B2 | 8/2009 | |
| JP | 20126695 | A | 1/2012 | |
| JP | 2019512440 | A | 5/2019 | |
| WO | WO-2007074206 | A1 * | 7/2007 | ........... B66B 11/007 |
| WO | WO-2012127683 | A1 * | 9/2012 | ........... B66B 11/022 |

OTHER PUBLICATIONS

Machine translation of JP 2019-512440.*
International Search Report issued on Sep. 28, 2021, in corresponding International Application No. PCT/JP2021/029674; 4 pages.

* cited by examiner

ELEVATOR SYSTEM

TECHNICAL FIELD

The present invention relates to an elevator system having multiple elevator cars that move independently within a single elevator hoistway.

BACKGROUND

In recent years, as a structure of an elevator system, a system structure having a pair of under-car pulleys provided on the lower side of a car frame respectively hung over a rope is known (see, for example, JP-A-2012-6695). Also known is a machine-room-less elevator system that eliminates a need for a rooftop machine room by making the control device compact and installing the device in the hoistway. Furthermore, in high-rise office buildings and high-rise residences, it is expected that elevators will be used in a wide range from the lower floors to the upper floors. As a system increasing transportation capability of the elevators, two or more elevators arranged in a hoistway (see, for example, Japanese Patent No. 4311590), and a double deck (double decker) type elevator connecting an upper car and a lower car are also known.

SUMMARY

However, in this double-deck type elevator system, to realize high-speed movement, the first car is exclusively for odd-numbered floors, and the second car on the lower side is exclusively for even-numbered floors. Therefore, for example, when a passenger gets on the first car dedicated to the odd-numbered floor even though he wants to go to the even-numbered floor, he may have to get off once and get on the elevator again in a less convenient manner.

Therefore, in view of the above technical problems, the present invention aims to provide an elevator system that can reduce the overall installation area of elevators in a building while ensuring the number of passengers in the elevators.

To solve the above technical problems, the elevator system of the present invention is an elevator system in which first and second elevator cars are arranged in a single elevator hoistway, wherein a pair of under-car pulleys are respectively disposed at the lower portions of the elevator cars to turn ropes vertically on the outer sides of the first and second elevator cars and horizontally on the bottoms of the cars. The arranging direction of the pair of the under-car pulley pair of the first elevator car intersects with the arranging direction of the pair of the under-car pulley pair of the second elevator car when projected onto a horizontal plane.

In the elevator system, the first and second elevator cars may be guided along a pair of main rails extending along the elevator hoistway, and the car of the first elevator car is guided along a pair of main rails extending along the elevator hoistway. The under-car pulley of the first elevator car may wind a rope extending on either one of the left and right sides of the main rail when viewed from the center of each car, whereas the under-car pulley of the second elevator car may wind a rope extending on the other one of the left and right sides of the main rail as viewed from the center of each car.

Further, in the elevator system, the pair of main rails can be arranged in an angular direction that is half of the angle of the intersecting arrangement direction of the under-car pulley pair. The first and second elevator cars are independently controlled as in the same size.

In addition, in such an elevator system, pulleys respectively attached to counterweights balancing the first and second elevator cars can also be configured such that the pulley's axial directions intersect with each other when projected onto a horizontal plane.

DETAILED DESCRIPTION

An elevator system according to each embodiment of the present invention will be described below with reference to FIG. 1 to FIG. 7.

First Embodiment

Figure 1:
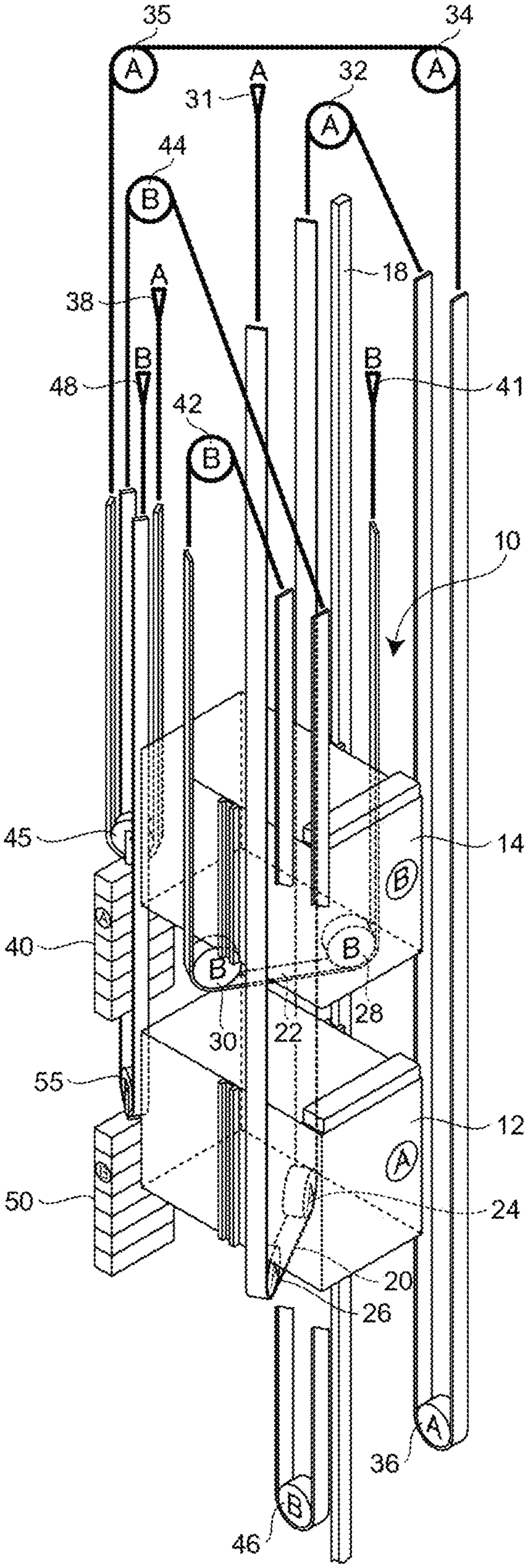
FIG. 1 is a configuration diagram of an elevator system according to a first embodiment of the present disclosure.

This embodiment is a so-called machine-room-less, lift-up type elevator system. As shown in FIG. 1, the elevator system is installed so that a first elevator car 12 and a second elevator car 14 are not connected to each other but are independently controllable in a single vertically extending elevator hoistway 10. In the elevator hoistway 10, the first elevator car 12 is positioned at the lower side, and the second elevator car 14 is positioned at the upper side. A pair of under-car pulleys 24, 26 is attached to the bottom of the first elevator car 12, and a pair of under-car pulleys 28, 30 is attached to the bottom of the second elevator car 14. This elevator system is, for example, a system for a passenger elevator installed in a multi-story building or facility. Suspension ropes 20, 22 are routed vertically on an outside of the first and second elevator cars 12, 14, and ropes 20, 22 are routed horizontally on the bottom.

Figure 2:
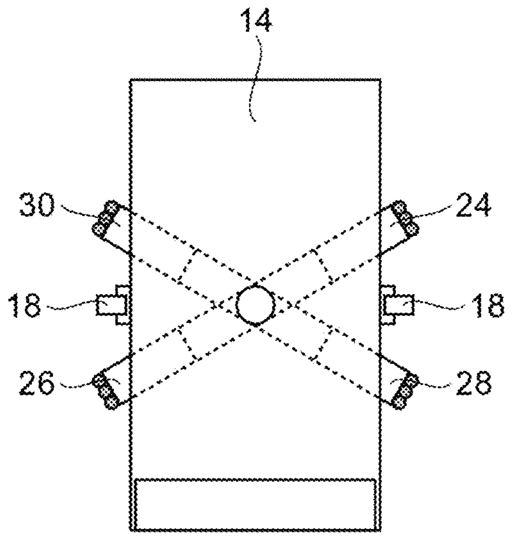
FIG. 2 is a schematic top view of a car portion of the elevator system of the first embodiment.

The first elevator car 12 is a substantially rectangular parallelepiped car, and is provided with an openable door on the front side. A pair of left and right guide shoes that slide on the left and right main rails 18 are formed at centers of the elevator side wall on the upper and the lower ends of the car. A crosshead member is provided near the pair of left and right guide shoes on the upper side to connect with the car top plate. A pair of under-car pulleys 24, 26 is supported via a pulley rotation shaft rotatably attached to a pulley frame (not shown). The pair of under-car pulleys 24, 26 is arranged obliquely to a line connecting a pair of main rails outside the car. That is, the under-car pulley 24 on the right side from the entrance of the car toward the back is arranged closer to the back side than the position of the main rail, and the under-car pulley 26 on the left side from the entrance of the car toward the back is arranged closer to the front from the position of the main rail. As a result, as shown in FIG. 2, the left suspension rope 20 is positioned on the front side, and the right suspension rope 20 is positioned on the back side. One suspension rope 20 is made of four suspension sub-set ropes, but only one is partially shown. Further, the pair of under-car pulleys 24, 26 have a positional relationship in which the rotation axes of the respective pulleys extend parallel.

In a similar fashion to the first elevator car 12, the second elevator car 14 is also a roughly rectangular parallelepiped car and has an openable door on a front side. A pair of left and right guide shoes that slide on the left and right main rails 18 are formed at centers of the elevator side wall on the upper and the lower ends of the car. A pair of under-car pulleys 28, 30 are supported respectively via pulley shafts rotatably attached to a pulley frame (not shown). The pair of under-car pulleys 28, 30 are arranged obliquely in the opposite direction to the first elevator car 14, particularly with respect to the line connecting the pair of main rails outside the car. That is, the under-car pulley 28 on the right side from the entrance of the car toward the back is arranged closer to the front side than the position of the main rail, and the under-car pulley 30 on the left side from the entrance of the car toward the back is located closer to the back side from the position of the main rail. As a result, as shown in FIG. 2, the suspension rope 22 on the right side is positioned on the front side, and the suspension rope 22 on the left side is positioned on the back side. The pair of under-car pulleys 28 and 30 have a positional relationship in which the rotation axes of the respective pulleys extend parallel.

When the first elevator car 12 and the second elevator car 14 arranged in the same elevator hoistway 10 are viewed from above, extending lines of the ropes of a pair of under-car pulleys 24, 26 and a pair of under-car pulleys 28, 30 are arranged to intersect when projected onto a horizontal plane. In other words, the suspension rope 20 for lifting up and down the first elevator car 12 extends vertically in or around the elevator hoistway 10 at least two places, but the suspension rope 22 used for the second elevator car 14 are vertically extended at places different from those places of the suspension rope 20 used in the first elevator car 12. Therefore, the suspension ropes 20 and 22 can move independently without interfering in or around the elevator hoistway 10. The first elevator car 12 and the second elevator car 14 are guided along a pair of main rails 18 that extend along the elevator hoistway 10. The under-car pulleys 24, 26 of the first elevator car 12 wind the suspension rope 20 extending on either one of the left and right sides of the main rail 18 when viewed from the center of the car, and the under-car pulleys 28, 30 of the second elevator car 14 are winds the suspending rope 22 extending on the other one of the left and right sides of the main rail 18 as viewed from the center of the car. As shown in FIG. 2, the pair of main rails 18 are arranged in an angular direction that is half the angle of the arrangement direction in which the under-car pulley pairs intersect.

The suspension rope 20 of the first elevator car 12 has one rope fixed end fixedly attached to a rope fixing portion 31 provided near a ceiling of the elevator hoistway 10, and extends vertically from the ceiling to wind around the under-car pulley 26 of the first elevator car 12 by about a quarter turn. The suspension rope 20 further extends upwardly through the bottom of the first elevator car 12 from the other undercar pulley 24. A pair of fixed pulleys 32, 34 is provided on the ceiling side of the elevator hoistway 10, and the suspension rope 20 wound around the fixed pulley 32 winds around a traction sheave portion of a drive motor 36 and reaches the fixed pulley 34. The suspension rope 20 is passed from the fixed pulley 34 to the fixed pulley 35, and a counterweight 40 is suspended between the fixed pulley 35 and a rope fixing portion 38 that holds the other end of the suspension rope 20. In FIG. 1, the first elevator car 12 and the pulleys wound around the suspension rope 20 are marked with letter A.

In a similar fashion, one end of the suspension rope 22 of the second elevator car 14 is fixedly attached to a rope fixing portion 31 provided near the ceiling of the elevator hoistway 10, and the suspension rope 22 vertically extended from the ceiling is wound around the under-car pulley 28 of the second elevator car 14 by approximately a quarter turn. The suspension rope 22 extends upwardly from the other under-car pulley 30 across the bottom of the second elevator car 14. A pair of fixed pulleys 42, 44 are provided on the ceiling side of the elevator hoistway 10. The suspension rope 22 winds around one of the fixed pulleys 42 and winds around the traction sheave portion of the drive motor 46 to reach the fixed pulley 44. Furthermore, the suspension rope 22 suspends a counterweight 50 between this fixed pulley 44 and a rope fixing portion 48 that holds the other end of the suspension rope 22. In FIG. 1, the second elevator car 14 and the pulleys wound around the suspension rope 22 are marked with letter B.

The positional relationship between the first elevator car counterweight 40 and the second elevator car counterweight 50 is set vertically in a narrow common space provided along the side wall of the elevator hoistway 10 with not connected to each other. The counterweight 40 used for the first elevator car 12 being located on the lower side of the elevator hoistway 10, is located on the upper side, whereas the counterweight 50 used for the second elevator car 14 being located on the upper side of the elevator hoistway 10, is located on the lower side. Pulleys 45, 55 are also attached to upper ends of those counterweights 40, 50, respectively. The pulley 45 is wound with the suspension rope 20 for the first elevator car, and the pulley 55 is wound with the suspension rope 22 for the second elevator car 14.

Figure 3:
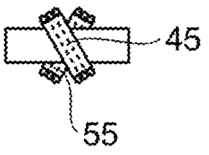
FIG. 3 is a schematic top view of a counterweight portion of the elevator system of the first embodiment.

As shown in FIG. 3, the pulley 45 attached to the counterweight 40 has an oblique positional relationship with respect to the longitudinal direction in the horizontal plane of the counterweight such that the left side of the pulley is the front side and the right side of the pulley is the back side. The pulley 55 attached to the counterweight 50 has an oblique positional relationship in which the left side of the pully is the back side and the right side of the pulley is the front side. For this reason, when the two pulleys 45, 55 are viewed from above in the vertical direction, the rotation planes of the pulleys intersect each other although the positions of the rotation shafts are generally aligned at the center. That is, the suspension ropes 20, 22 of the first and second elevator cars 12, 14 are arranged so as not to be in the same position, the suspension ropes 20, 22 are arranged at the pulleys 45, 55 of the counterweights 40, 50 so as not to be in the same position in substantially the same manner.

As described above, in the elevator system of this embodiment, the first elevator car 12 and the second elevator car 14 are separately positioned vertically in the elevator hoistway 10, and are controlled to be operated independently of each other. This is because independent suspension ropes 20, 22 passing through different positions can be used even within the same elevator hoistway 10. For this reason, the elevator system includes the under-car pulleys 24, 26, 28, and 30 on the side of the cars crossing in the shape of the letter X when projected onto the horizontal plane, and similarly, the pulleys 45, 55 on the side of the counterweights 40, 50 crossing with the angle of the shape of the letter X when projected onto the horizontal plane. This system is particularly effective for machine-room-less type elevator systems that are particularly space-saving, and is particularly effective for high-rise buildings. Although it is possible to divide the number of floors used by the first elevator car 12 and the second elevator car 14 into upper and lower parts, both of the first elevator car 12 and the second elevator car 14 can be shared between the top floor and the bottom floor, where space sufficient for waiting one car is secured above the top floor and below the bottom floor, respectively.

Figure 4:
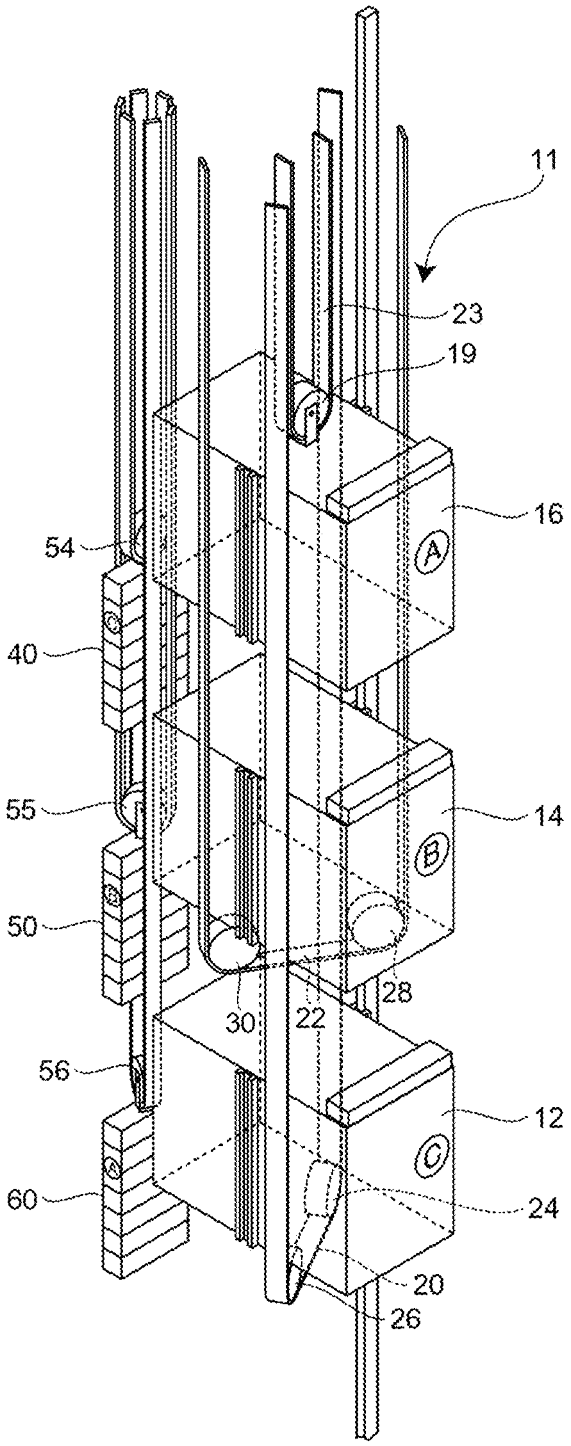
FIG. 4 is a configuration diagram of an elevator system according to a second embodiment of the present disclosure.
Figure 5:
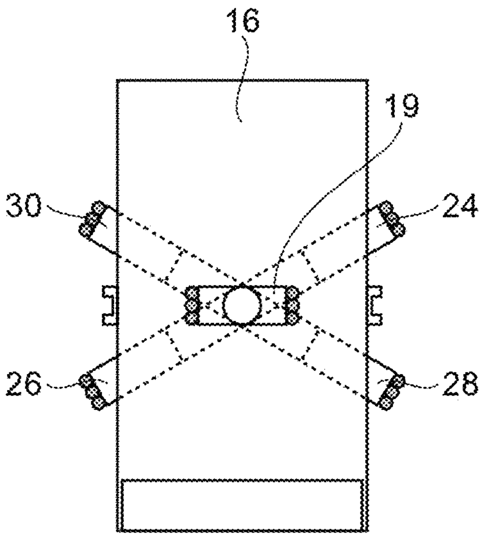
FIG. 5 is a schematic top view of a car portion of the elevator system of the second embodiment.
Figure 6:
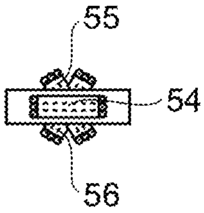
FIG. 6 is a schematic top view of a counterweight portion of the elevator system of the second embodiment.

Next, an elevator system of the second embodiment will be described with reference to FIG. 4 to FIG. 6. The elevator system of this embodiment is an example in which three elevator cars 12, 14, 16 are arranged in a single elevator hoistway 11. The three elevator cars 12, 14, 16 are generally of the same size, and form a first elevator car 12, a second elevator car 14, and a third elevator car 16 in order from the bottom in the single elevator hoistway 11. The elevator system has a structure in which a third elevator car 16 is added within the same elevator hoistway 11, especially when compared with the elevator system of the first embodiment described above.

That is, in the elevator system of this embodiment, as in the previous embodiment, not to guide, to the same position, the suspension ropes 20, 22 wound by the under-car pulleys 24, 26, 28, 30 of the first elevator car 12 and the second elevator car 14, the arrangement directions of the under-car pulleys 24, 26, 28, 30 are set to directions so that obliquely intersects when projected onto the horizontal plane. In addition, a third elevator car 16 is arranged above the second elevator car 14 in the same elevator hoistway 11, but the third elevator car 16 does not have an under-car pulley, and a single car upper pulley 19 is provided on a ceiling portion of the third elevator car 16. As also shown in FIG. 5, the suspension rope 23 of the third elevator car 16 is guided to pass approximately near the center of the car when projected onto a horizontal plane, and therefore the suspension rope 23 of the third elevator car 16 does not interfere with the suspension ropes 20, 22 guided outside each car.

Similarly, the suspension ropes 20, 22, 23 are guided so as not to be in the same position on the counterweight sides. The first counterweight 40, the second counterweight 50, and the third counterweight 60 are installed in a narrow common space provided along the side wall of the elevator hoistway 11 without being connected to each other in the vertical direction, and are suspended from suspension ropes 20, 22, and 23, respectively. As shown in FIG. 6, when the three counterweights are viewed from above, each of the pulleys 54, 55, 56 of the counterweights are arranged with different orientations so that the pulleys are configured to diverge in three directions from the central axis. The top counterweight 40 is connected to the first elevator car 12 located at the bottom; the middle counterweight 50 is connected to the second elevator car 14 located at the middle; the bottom counterweight 60 is connected to the third elevator car 16 located at the top. The pulley 54 for suspending the uppermost counterweight 40 extends along the length of the counterweight when projected onto the horizontal plane, and the remaining two pulleys 55, 56, when projected onto the horizontal plane, are extended in the crossing direction in a similar way to those of the previous embodiment. As a result, the suspension ropes 20, 22, 23 wound around each pulley 54, 55, 56 of each counterweight are guided so as not to be in the same position, thereby operating in association with the three elevator cars 12, 14, 16 in being independently controlled.

Figure 7:
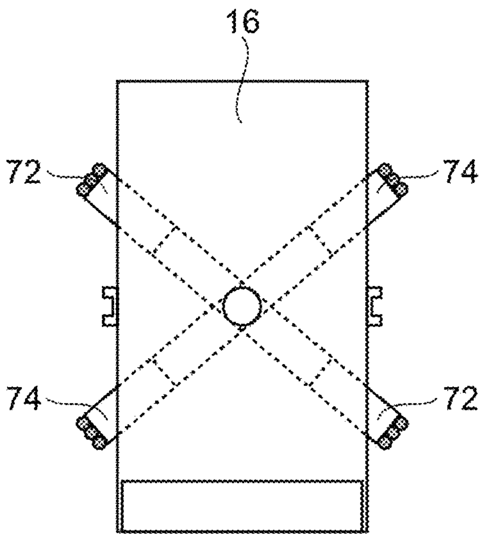
FIG. 7 is another schematic top view of a car portion of a modification of the elevator system of the second embodiment.

FIG. 7 is a modification of the second embodiment, in which two pairs of pulley combinations 72, 74 are depicted. The angle formed by the combination 72, 74 of these two pairs of pulleys is configured to intersect at an angle of approximately 90 degrees when projected onto a horizontal plane, and the distance between the suspension ropes 20, 22 may be taken larger than the structure shown in FIG. 5.

In the elevator system of each embodiment, by using the under-car pulleys, it is possible to have a structure in which each car is suspended from the lower part of the car as a pair. It is also possible to install the under-car pulley at a predetermined angle by providing a fixing member such as a groove or a bolt in the lower part of the car in a predetermined direction and installing the under-car pulley for each frame in that direction. It is also possible to adjust the angle after attaching the frame holding the pair of under-car pulleys to the center of the bottom of the car.

In the elevator system of each of the above-described embodiments, two cars are configured so as to prevent interference between suspension ropes, but the system can also be applied to three or more cars, and can be used for high-rise buildings. This is particularly advantageous in terms of transport efficiency per occupied area when constructing an elevator system. In addition, although an example in which the counterweight side is hung side by side in the vertical direction has been described, even in a structure in which the position in the horizontal direction is originally shifted, interference between the suspension ropes of two or more cars can be prevented.

What is claimed is:

1. An elevator system, in which first, second, and third elevator cars are arranged, in order from the bottom, in a single elevator hoistway, the elevator system comprising:

a pair of under-car pulleys positioned on the lower portions of the first and second elevator cars, respectively, configured to turn ropes vertically on the outer sides of the first, second, and third elevator cars and horizontally on the bottom of the first and second elevator cars, and an arrangement direction of the under-car pulley pair of the first elevator car intersects an arrangement direction of the under-car pulley pair of the second elevator car when projected onto a horizontal plane, and a single upper pulley positioned at a center on a ceiling position of the third elevator car in a way that a rope of the third elevator car does not interfere with the ropes of the first and second elevator cars.

2. The elevator system according to claim 1, wherein said first and second elevator cars are guided along a pair of main rails extending along said elevator hoistway, said pair of main rails including a left side main rail and a right side main rail, wherein the under-car pulley of the first elevator car winds a the rope extending on either one of the left side main rail and right sides main rail when viewed from a center of each car, and wherein the under-car pulley of the second elevator car winds a rope extending on the other one of the left side main rail and right sides main rail as viewed from the center of each car.

3. The elevator system according to claim 1, wherein a pair of main rails is arranged in an angular direction that is a half of angle of the an arrangement direction in which the pairs of under-car pulleys intersect with each other.

4. The elevator system of claim 1, wherein said first, second, and third elevator cars are independently operated and are of a same size.

5. The elevator system according to claim 1, wherein an axial directions of pulleys attached to counterweights that balance the first and second elevator cars also intersect when projected onto the horizontal plane.

* * * * *